July 15, 1958  J. MARKESTEIN ET AL  2,843,057
RAILWAY VEHICLE SUSPENSION
Filed Dec. 7, 1955  3 Sheets-Sheet 2
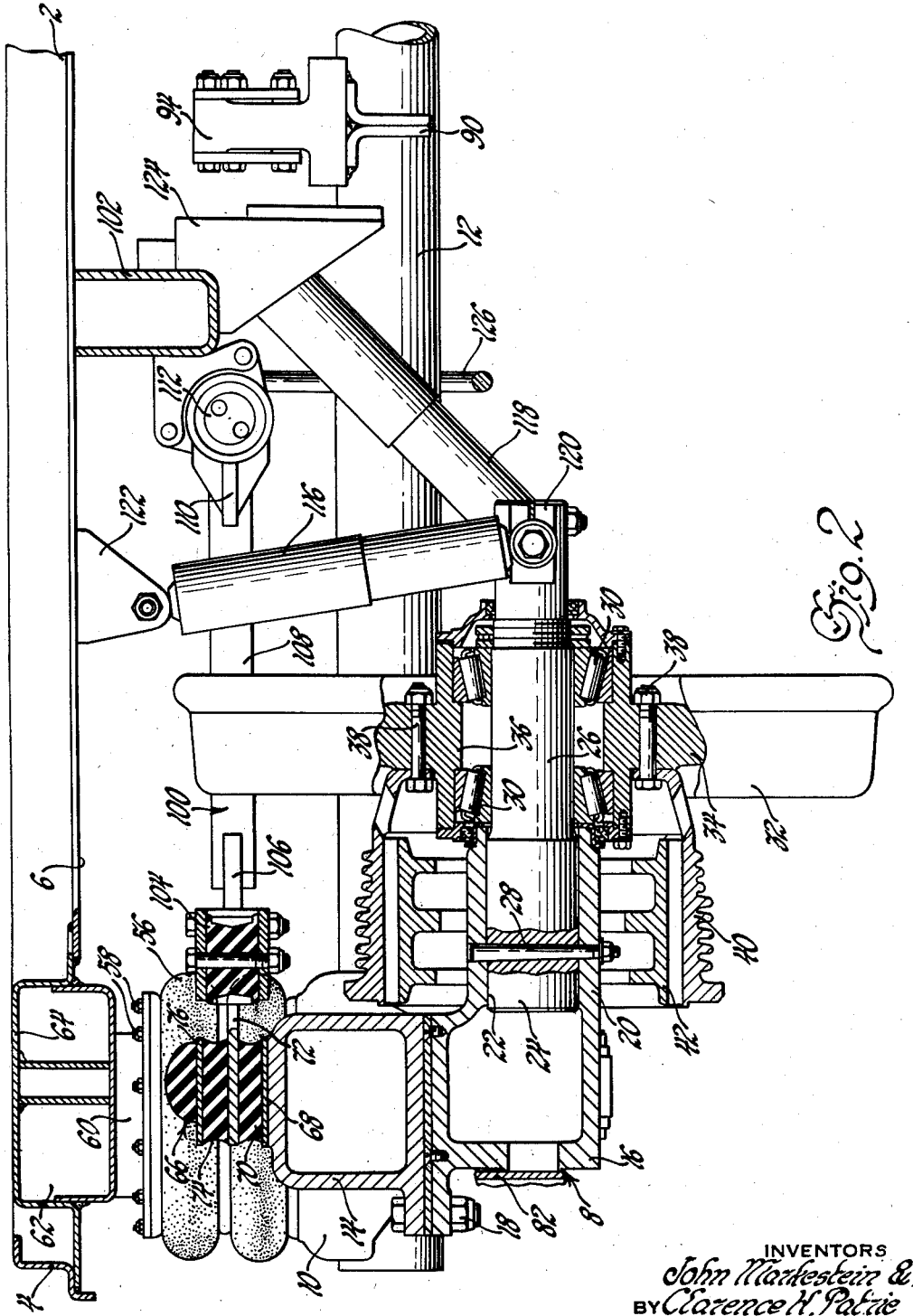
INVENTORS
John Markestein &
BY Clarence H. Patzie
J. C. Thorpe
ATTORNEY

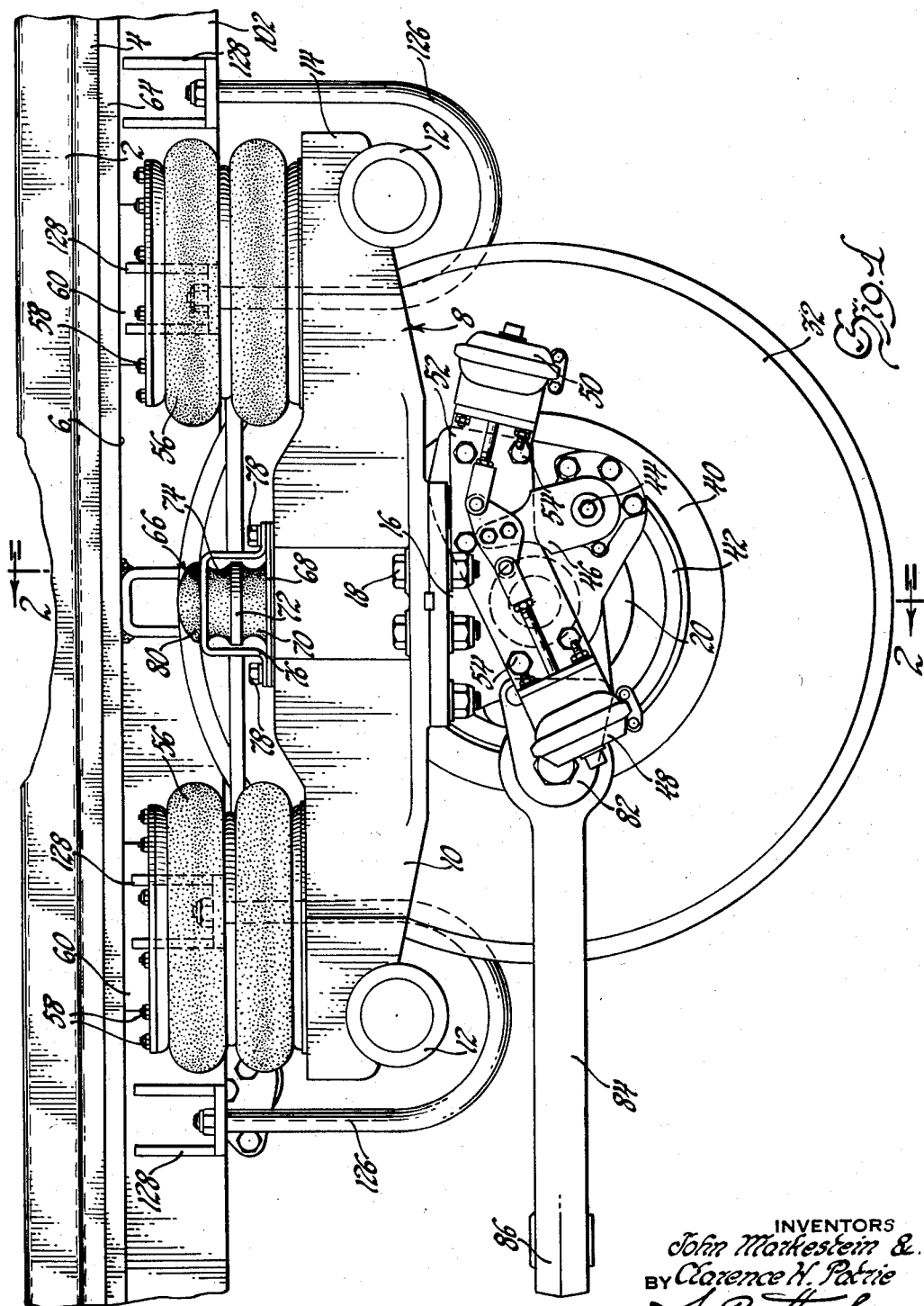

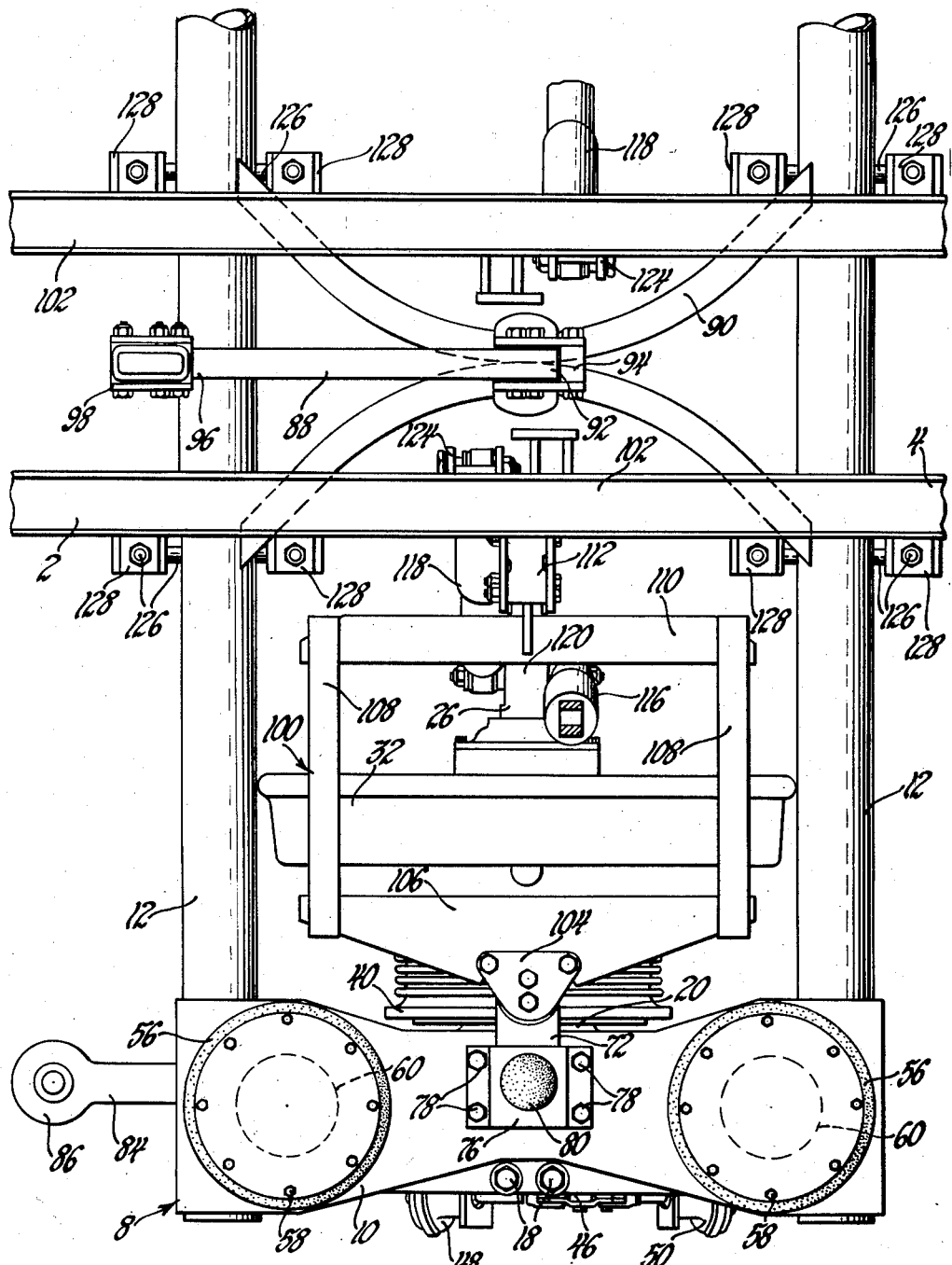

United States Patent Office 2,843,057
Patented July 15, 1958

2,843,057

RAILWAY VEHICLE SUSPENSION

John Markestein, Westchester, and Clarence H. Patrie, La Grange, Ill., assignors to General Motors Corporation, Detroit, Mich., a corporation of Delaware Application December 7, 1955, Serial No. 551,548

5 Claims. (Cl. 105—180)

This invention relates generally to railway vehicles and more particularly to suspensions for passenger and freight cars of recently innovated lightweight construction.

Because of the large annual deficit suffered by the railroads each year from their passenger service considerable effort has been expended in an attempt to reduce this deficit. It has been proposed in order to reduce this deficit to make passenger cars as cheaply as possible out of lightweight materials and to reduce the number and size of the components going into such cars without sacrificing safety and comfort.

One of the means for reducing the number of components and also the weight of such vehicles is to change the suspensions at either end of the cars. Heretofore such suspensions have included a truck having a frame and a bolster resiliently supported thereon and either two or three sets of wheels and axles.

The present invention is proposed to eliminate certain of the wheels and axles of prior four-wheel, six-wheel, two-axle, three-axle trucks, so that a suspension is provided for each end of such vehicles which utilizes what amounts to a single wheel-and-axle set. The invention further reduces the amount of weight by uniquely employing stub axles instead of the so-called "through" axles previously used.

The present invention also proposes novel unit-change-out assemblies including wheel pieces carrying the aforementioned stub axles and wheels along with brake rigging for these wheels. In this manner should the brake rigging, axle or wheel need replacing or repair it is a simple matter to merely remove the defective unit and replace it with one which is not defective thereby eliminating the need for expensive repair operations which disable the entire car or at least a whole truck for extended periods of time. The defective unit may then be conveniently repaired in the shop.

The use of a single wheel-and-axle set at the end of a railway vehicle, however, raises several problems particularly since such a suspension must be at least as safe and as comfortable as conventional suspensions. One of the most difficult of such problems is the manner of stabilizing the suspension so that it is prevented from moving longitudinally with respect to the vehicle and prevented from "rolling" about a transverse axis while at the same time allowing cushioned lateral, vertical and swinging movement of the truck relative to the vehicle body.

It is therefore an object of the present invention to provide a unique railway vehicle suspension which while improving safety and riding qualities is lighter and includes fewer component parts than more conventional suspensions.

It is another object of the invention to provide a suspension for lightweight railway vehicles which includes a novel unit-change-out assembly including a wheel piece detachably secured to the truck frame which carries the stub axle, a wheel, and brake rigging for the wheel.

It is a still further object of the invention to provide a suspension which not only eliminates the usual multiple sets of wheels and axles but additionally eliminates the "through" axle-type of suspension while at the same time improving the safety and comfortableness of the ride.

For a fuller understanding of the invention and the above and other objects thereof reference may be had to the accompanying detailed description and the drawings, in which:

Figure 1 is a side view in elevation of the novel suspension located below one end of a railway vehicle.

Figure 2 is an end view also in elevation with parts broken away and in section further illustrating the novel suspension.

Figure 3 is a plan view of the suspension and serves particularly to illustrate the novel lateral stabilizing means therefor.

Referring now to the three views, a vehicle—only a portion of which is shown—is indicated by the numeral 2. The vehicle includes a vehicle body 4 having an underside 6 below which is disposed the novel suspension indicated generally by a numeral 8. The suspension 8 comprises, as best seen in Figure 3, a pair of longitudinally extending beams or members 10 and a pair of transversely extending tubular members 12 fixed together at their ends, such as by welding, so as to form a transversely extending rectangular frame 14. Each of the members or beams 10 of frame 14 have wheel members or pieces 16 rigidly fixed thereto by means of the nut-and-bolt assemblies 18. These wheel pieces 16, as best seen in Figure 2, include a laterally, inwardly extending portion 20 having an inner surface 22 for the reception of the end 24 of a stub axle 26. The axle 26 is prevented from rotation relative to the piece 16 by a tapered pin 28 extending through the end 24 and the portion 20. Mounted on the axle 26 for rotation with respect thereto due to the presence of the tapered roller bearing sets 30 is a wheel 32. Wheel 32 has secured to its web 34 adjacent its hub 36 by bolt assemblies 38 a brake drum 40 which receives the laterally inwardly extending portion 20. Portion 20 acts to support an internal brake head and shoe assembly 42. The shoe assemblies 42 are applied to the braking surface of the drum 40 by a conventional reverse-curve cam (not shown) fixed to a shaft 44 journaled in the wheel piece 16 and turnable by the lever 46. The lever 46 is acted upon by oppositely disposed brake cylinder assemblies 48 and 50 supported on a bracket 52 in turn fixed to the wheel piece 16 by the studs 54.

Resiliently supported on the longitudinally extending beams 10 of frame 14 through the medium of sets of longitudinally spaced air bellows assemblies 56 is the vehicle body 4. These air bellows 56 are rigidly connected at their upper ends by studs 58 to a rigid hollow flanged duct 60 which communicates with the interior 62 of a longitudinally extending enclosed beam 64 acting in a dual capacity as an air reservoir and a longitudinal strength member of the vehicle body. The lower ends of the air bellows 56 are fixed to the beams 10. The supply of air and the exhaustion of air from the interior 62 of the beams 64 is accomplished by suitable valve means (not shown) which are operated by relative vertical static deflection between the body 4 and the beams 10 so as to pump up or deflate the air bellows assemblies 56 to maintain the body 2 at a substantially constant vertical distance from the top of the rails.

In the event that the air bellows 56 should become inadvertently deflated or the deflection between the underside of the vehicle 4 and the frame 14 is excessive, means 66 cushioning and limiting this vertical deflection have been provided intermediate the sets of air bellows 56. Each of these means includes a rubber sandwich assembly made up of a lower plate 68 to which is bonded a rubber insert 70. Insert 70 is also bonded to a plate 72 which has an additional purpose to be described more fully later. The upper side of plate 72 has a second resilient insert 74 bolted thereto which is also bolted to an anchoring bracket or clamping device 76. Clamping device 76 is rigidly secured to the beams 10 intermediate their ends by means of studs 78. Atop the bracket 76 is a resilient button 80 which the underside of the vehicle is adapted to engage upon extended vertical movement of body 4 relative to truck frame 14. As previously emphasized, this structure will serve to support the body 4 on the frames 10 in the event the air bellows assembly 56 are deflated or become unduly compressed.

To prevent longitudinal movement of the suspension relative to the vehicle body 4 it will be observed particularly in Figures 1 and 3 that the wheel pieces 16 have fixed thereto by fastening plates 82 radius rod and torque arms 84 whose opposite ends 86 are adapted to be connected by suitable links and fastening means to the body 4. To assist the radius rods 84 in preventing longitudinal movement of the frame 14 relative to the body 4 a third radius rod 88 is pivotally fastened to the tubular members 12 through the medium of a pair of U-shaped cross pieces 90 secured at their opposite ends to these tubes by welding. The end 92 of rod 88, as previously mentioned, is allowed to pivot, and does so, in a bracket 94 mounted on cross pieces 90. The opposite end 96 of rod 88 pivots in a bracket 98 fixed to the underside of the vehicle 4. This radius rod 88 extends generally longitudinally and is vertically stepped above the rods 84 so that a quadrilateral linkage is formed by the rods 84, 88, the vehicle body 4 and frame 14 when looking at the side elevation of the suspension. This quadrilateral linkage prevents the frame from tending to rotate about the axis of the wheels relative to the vehicle body 4.

To stabilize the frame 14 against excessive lateral movement relative to the vehicle body 4 a novel lateral stabilizing assembly indicated generally by a numeral 100 has been provided. There are two of the assemblies 100 which extend generally from U-shaped supports 102 adjacent opposite sides of the transverse center of the truck to the vertical limiting means 66. Each of these lateral stabilizers includes previously mentioned plate member 72 to which is fixed through a resilient bushing and clamping assembly 104 a longitudinally extending cross link 106 having secured to opposite ends thereof a pair of transversely extending pieces 108. The opposite ends of pieces 108 are in turn secured to a longitudinally extending cross member 110 which is pivotally fastened through a resiliently bushed connection 112 to the support 102.

The air bellows 56 provide cushioned lateral and vertical relative movement of the suspension relative to the vehicle body 4 which to render the suspension safe should be damped. The present invention provides damping in the form of pairs of shock absorbing assemblies 116 and 118 which lie in a vertical transverse plane and are inclined from the vertical at different angles on opposite sides of a longitudinally extending vertical plane so that all movements of the suspension relative to the body receive adequate damping. These shock absorbing assemblies have their lower ends pivotally fastened to the free ends 120 of the stub axles 26. The opposite end of the assembly 116 is pivotally fastened through a bracket 122 to the body 4 whereas the assembly 118 has its opposite end connected through a bracket 124 fixed to the member 102. The use of the unique stub axles of the present invention enables these shock absorbing assemblies 116 and 118 to be located inboard of the vehicle where they are less subject to damage.

To prevent extended separation of the suspension from the vehicle body and undue strains on the air bellows 56 when the vehicle is lifted for any reason from the rails safety U-shaped tie bars 126 are provided at rectangularly spaced locations which encircle the tubular members 12 and have their ends anchored to brackets 128 fixed to longitudinally extending strength members 102 of the vehicle body 4.

From the foregoing it will be appreciated that merely by undoing the shock absorbing assemblies 116, 118 from the ends 120 of the stub axles 26 and removing the studs 18 after jacking up the beams 10 and unfastening the torque rods 84, the wheels, the axles and the brake rigging can all be removed as a unit and quickly and easily replaced so that any defects in these assemblies becomes a simple bench repair job.

The suspension by the utilization of stub axles results in a substantial saving in weight and provides a safer location for securing the ends of the shock absorbing assemblies 116, 118. The lateral and vertical stabilizing and limiting means in combination with the shock absorbing assemblies allow only the regulated type of damped movement which results in a safe and superior ride.

What we claim is:

1. In combination with a vehicle body, a suspension therefor comprising a truck frame disposed therebelow, a pair of transversely spaced axles cantilevered to said frame adjacent outboard portions thereof, a wheel mounted on each of said axles, resilient means interposed between said body and frame supporting said body on said frame, means stabilizing said frame relative to said body, and shock-absorbing means connected between the free ends of said axles and said body.

2. In combination with a vehicle body, a suspension therefore comprising a truck frame disposed therebelow, a pair of transversely spaced axles cantilevered to said frame therebelow and extending inwardly toward the center of said suspension, a wheel rotatably mounted on each of said axles, air bellows interposed between said frame and said body resiliently supporting said body on said frame, a shock-absorbing device secured to the free end of each of said axles and extending generally vertically and outwardly and having an end secured to the underside of said body, a second shock-absorbing device fixed to the free end of each of said axles extending diagonally inwardly relative to the suspension and secured to the underside of said vehicle body to thereby damp vertical lateral and swinging movement of said frame relative to said body.

3. A suspension for a railway vehicle including a vehicle body comprising a truck frame disposed below said body, a stub axle cantilevered to said frame and extending inwardly relative to said vehicle, a wheel rotatively mounted on said axle, resilient means supporting said body on said frame, and means laterally stabilizing said frame relative to said body including a laterally extending linkage resistive in compression having flexible connections between said frame and said body, said linkage extending laterally in substantially the same vertical plane containing the axis of said wheel and comprising laterally and longitudinally extending pieces defining a substantially horizontal window intersected by the vertical plane of said wheel to effect a linkage between said body and frame below the upper part of said wheel.

4. A suspension for a railway vehicle including a vehicle body, comprising a truck frame disposed below said body, a stub axle cantilevered to said frame and extending inwardly relative to said vehicle, a wheel rotatively mounted on said axle, resilient means supporting said body on said frame, and means laterally stabilizing said frame relative to said body including a laterally extending linkage resistive in compression having flexible connections between said frame and said body, the connection of said linkage to said frame including a resilient upstanding projection between said frame and said body acting to resist extended downward lateral movement of said body relative to said frame.

5. In a railway vehicle including a vehicle body, a suspension disposed therebelow comprising a rectangularly transversely extending truck frame made up of a pair of longitudinally extending beams rigidly fixed at opposite ends to the ends of a pair of transversely extending members, an axle mounting piece detachably fixed to each of said longitudinally extending beams, a transversely extending stub axle mounted in each of said pieces and having thereon a rotatable wheel, longitudinally spaced sets of air bellows seated on each of said longitudinally extending beams resiliently supporting said body on said frame, generally longitudinally extending transversely and vertically spaced radius rods secured to said frame and adapted to be secured to said vehicle body stabilizing said frame relative to said body against longitudinal and rolling movement about a transversely extending axis, and a lateral stabilizing assembly extending transversely of said vehicle and including a linkage spanning one of said wheels and having an end pivotally fixed to said body and an opposite end fixed by resilient connection to one of said beams, said resilient connections each having an upstanding resilient vertical projection located between the sets of air bellows on said beam engageable with the underside of said body to limit vertical movement of said body relative to said frame, and oppositely diagonally extending shock absorbing devices connected between the ends of said axles and said body to damp vertical lateral and swinging movement of said truck relative to said body.

References Cited in the file of this patent

UNITED STATES PATENTS

| | | |
|---|---|---|
| 1,730,036 | Gregg | Oct. 1, 1929 |
| 2,647,470 | MacVeigh | Aug. 4, 1953 |